United States Patent
Ashrafzadeh et al.

(10) Patent No.: US 12,204,892 B2
(45) Date of Patent: Jan. 21, 2025

(54) USING TEMPLATES TO PROVISION INFRASTRUCTURES FOR MACHINE LEARNING APPLICATIONS IN A MULTI-TENANT ON-DEMAND SERVING INFRASTRUCTURE

(71) Applicant: Salesforce.com, Inc., San Francisco, CA (US)

(72) Inventors: Seyedshahin Ashrafzadeh, Foster City, CA (US); Yuliya L Feldman, Campbell, CA (US); Alexandr Nikitin, El Sobrante, CA (US); Manoj Agarwal, Cupertino, CA (US); Chirag Rajan, Burlingame, CA (US); Swaminathan Sundaramurthy, Los Altos, CA (US)

(73) Assignee: Salesforce, Inc., San Francisco, CA (US)

( * ) Notice: Subject to any disclaimer, the term of this patent is extended or adjusted under 35 U.S.C. 154(b) by 900 days.

(21) Appl. No.: 17/337,388

(22) Filed: Jun. 2, 2021

(65) Prior Publication Data
US 2022/0391199 A1    Dec. 8, 2022

(51) Int. Cl.
*G06F 9/44* (2018.01)
*G06F 8/60* (2018.01)
(Continued)

(52) U.S. Cl.
CPC ............... *G06F 8/71* (2013.01); *G06F 8/60* (2013.01); *G06F 9/45512* (2013.01);
(Continued)

(58) Field of Classification Search
CPC ...... G06F 8/71; G06F 8/60; G06F 8/10; G06F 9/45512; G06F 11/3037; G06F 11/328;
(Continued)

(56) References Cited

U.S. PATENT DOCUMENTS 7,730,478 B2    6/2010 Weissman
8,577,870 B2    11/2013 Rajan et al.
(Continued)

OTHER PUBLICATIONS

Ignacio A. Cano, Optimizing Distributed Systems using Machine Learning, 2019, [Retrieved on Oct. 31, 2024]. Retrieved from the internet: <URL: https://digital.lib.washington.edu/server/api/core/bitstreams/ba249d20-2ea5-48c5-8707-0925c9d7f941/content> 162 Pages (1-162) (Year: 2019).*

(Continued)

*Primary Examiner* — Anibal Rivera
(74) *Attorney, Agent, or Firm* — Nicholson, De Vos, Webster & Elliott, LLP (57) ABSTRACT

A method by one or more electronic devices to provision an infrastructure for a machine learning application in a multi-tenant on-demand serving infrastructure. The method includes storing a plurality of templates, wherein each of the plurality of templates indicates a scoring interface, a web server, a definition of a continuous integration pipeline, and a definition of a continuous deployment pipeline, receiving a request to provision the infrastructure for the machine learning application using a specified template from the plurality of templates, and provisioning the infrastructure for the machine learning application using the specified template to create a version control system repository, a continuous integration pipeline, and a continuous deployment pipeline.

20 Claims, 5 Drawing Sheets

(51) Int. Cl.
*G06F 8/71* (2018.01)
*G06F 9/455* (2018.01)
*G06F 11/14* (2006.01)
*G06F 11/30* (2006.01)
*G06F 11/32* (2006.01)
*G06F 11/34* (2006.01)
*G06N 20/00* (2019.01)
*G06F 8/10* (2018.01)
*G06F 11/36* (2006.01)

(52) U.S. Cl.
CPC ........ *G06F 11/3037* (2013.01); *G06F 11/328* (2013.01); *G06F 11/3476* (2013.01); *G06N 20/00* (2019.01); *G06F 8/10* (2013.01); *G06F 11/368* (2013.01)

(58) Field of Classification Search
CPC .. G06F 11/3476; G06F 11/368; G06F 11/448; G06N 20/00
See application file for complete search history.

(56) References Cited

U.S. PATENT DOCUMENTS

| | | | |
|---|---|---|---|
| 9,189,521 B2 | 11/2015 | Rajan et al. | |
| 9,286,343 B2 | 3/2016 | Kim et al. | |
| 9,760,594 B2 | 9/2017 | Kim et al. | |
| 10,108,648 B2 | 10/2018 | Rajan et al. | |
| 10,152,511 B2 | 12/2018 | Rajan et al. | |
| 2017/0124487 A1* | 5/2017 | Szeto | G06F 11/1448 |
| 2018/0364985 A1* | 12/2018 | Liu | G06F 11/3664 |
| 2019/0108248 A1 | 4/2019 | Rajan et al. | |
| 2022/0237505 A1 | 7/2022 | Feldman et al. | |
| 2022/0237506 A1 | 7/2022 | Feldman et al. | |
| 2022/0318647 A1 | 10/2022 | Ashrafzadeh et al. | |
| 2022/0382539 A1 | 12/2022 | Gumashta et al. | |
| 2022/0382601 A1 | 12/2022 | Feldman et al. | |

OTHER PUBLICATIONS

Automl.org, "AutoML . . . ", AutoML.org: Freiburg-Hannover, Available Online at <https://www.automl.org>, retrieved on Mar. 9, 2021, 1 page.

Microsoft Research, "AutoML", Available Online at <https://www.microsoft.com/en-US/research/project/automl/>, retrieved on Mar. 9, 2021, 2 pages.

Nabar, Shubha, "Open Sourcing TransmogrifAI: Automated Machine Learning for Structured Data", Available Online at <https://engineering.salesforce.com/open-sourcing-transmogrifai-4e5d0e098da2>, Aug. 16, 2018, 10 pages.

Preston-Werner, T., "Semantic Versioning 2.0.0," Creative Commons ? CC By 3.0, downloaded from https://semver.org/ on May 26, 2021, pp. 1-7.

* cited by examiner

USING TEMPLATES TO PROVISION INFRASTRUCTURES FOR MACHINE LEARNING APPLICATIONS IN A MULTI-TENANT ON-DEMAND SERVING INFRASTRUCTURE

TECHNICAL FIELD

One or more implementations relate to the field of machine learning, and more specifically to using templates to provision infrastructures for machine learning applications in a multi-tenant on-demand serving infrastructure.

BACKGROUND

Machine learning is a type of artificial intelligence that deals with computer algorithms that automatically improve through experience and/or by the use of data. Machine learning algorithms may build a model (also referred to as a predictive model) based on training data (also referred to as sample data) to make predictions or decisions without being explicitly programmed to do so. A model may be a representation of what a machine learning algorithm has learned after analyzing training data. Machine learning algorithms are used in a wide variety of applications such as email filtering and computer vision, where it is difficult or unfeasible to develop conventional algorithms to perform the needed tasks. Machine learning algorithms are also used in customer relationship management (CRM) systems to help make business decisions based on customer data.

Machine learning typically involves three phases: feature engineering, model training, and model serving (also referred to as predicting or inferencing). Feature engineering involves the use of domain knowledge to extract features from data that is deemed to be useful for purposes of training models. Model training involves the use of machine learning to train models based on the training data. Model serving involves receiving requests to apply the models to new (unseen) data, applying the trained models to the new data to generate scoring results (e.g., predictions or inferences), and providing the scoring results as responses to the scoring requests.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for using templates to provision infrastructures for machine learning applications in a multi-tenant on-demand serving infrastructure.

A multi-tenant on-demand (model) serving infrastructure (simply referred to herein as a serving infrastructure) may provide a scoring service that serves models for multiple tenants on demand A tenant may be a group of users who are part of a common organization or share common access privileges to the multi-tenant system and the associated software applications.

The serving infrastructure may include multiple scoring containers that each include a scoring library (e.g., AutoML®, Transmogrifai®, TensorFlow®, or PyTorch®) that the scoring container can use to apply models to new data to generate scoring results (e.g., predictions/inferences based on the new data). As used herein, a container is a unit of software that packages code and its dependencies so that the application runs quickly and reliably from one computing environment to another (e.g., a Docker® container). A container image is a lightweight, standalone, executable package of software that includes the resources (e.g., code, runtime, system tools, system libraries, and settings) needed to run the application. Container images become containers at runtime (e.g., when executed by a container engine). A benefit of containerizing an application is that it allows the application to run uniformly across different computing environments.

Each scoring container in the serving infrastructure may provide scoring functionality for one or more machine learning applications or use cases. The scoring containers may be organized into clusters, where each cluster includes a group of scoring containers having the same scoring library (e.g., same type and same version of a scoring library). Each cluster of scoring containers may provide scoring functionality for one or more machine learning applications or use cases.

In existing serving infrastructures, onboarding a new machine learning application (e.g., to provide scoring functionality for the machine learning application) requires manually designing and provisioning various infrastructure for the machine learning application such as a web server, a continuous integration (CI) pipeline, and a continuous deployment (CD) pipeline. This setup process can be complex and take a long time to complete (e.g., in the order of months).

Implementations disclosed herein simplify the process by providing templates that can be used to provision infrastructures for machine learning applications. A template may include various information that can be used to provision an infrastructure for a machine learning application. For example, a template may indicate a scoring interface, a web server, a definition of a continuous integration pipeline, and a definition of a continuous deployment pipeline. The infrastructure for a machine learning application may be provisioned by sending a request to an infrastructure provisioning component to provision the infrastructure using a specified template. In response to receiving the request, the infrastructure provisioning component may provision the infrastructure for the machine learning application according to information included in the specified template. For example, the infrastructure provisioning component may provision the infrastructure for the machine learning application by (1) creating a version control system repository for the machine learning application that includes a project that has dependencies on a library of the scoring interface indicated in the specified template and a library of the web server indicated in the specified template, (2) creating a continuous integration pipeline for the machine learning application based on the definition of the continuous integration pipeline indicated in the specified template, and (3) creating a continuous deployment pipeline for the machine learning application based on the definition of the continuous deployment pipeline indicated in the specified template. The continuous integration pipeline of the machine learning application may build a scoring container image based on the project included in the version control system repository of the machine learning application. The continuous deployment pipeline of the machine learning application may deploy a cluster of scoring containers (that provides scoring functionality for the machine learning application using the web server and the scoring interface) based on the scoring container image. Implementations may be used to automatically (with reduced manual effort) provision infrastructures for machine learning applications in a matter of hours/days (instead of months, as it takes using existing methods). Implementations will now be described with reference to the accompanying figures.

Figure 1:
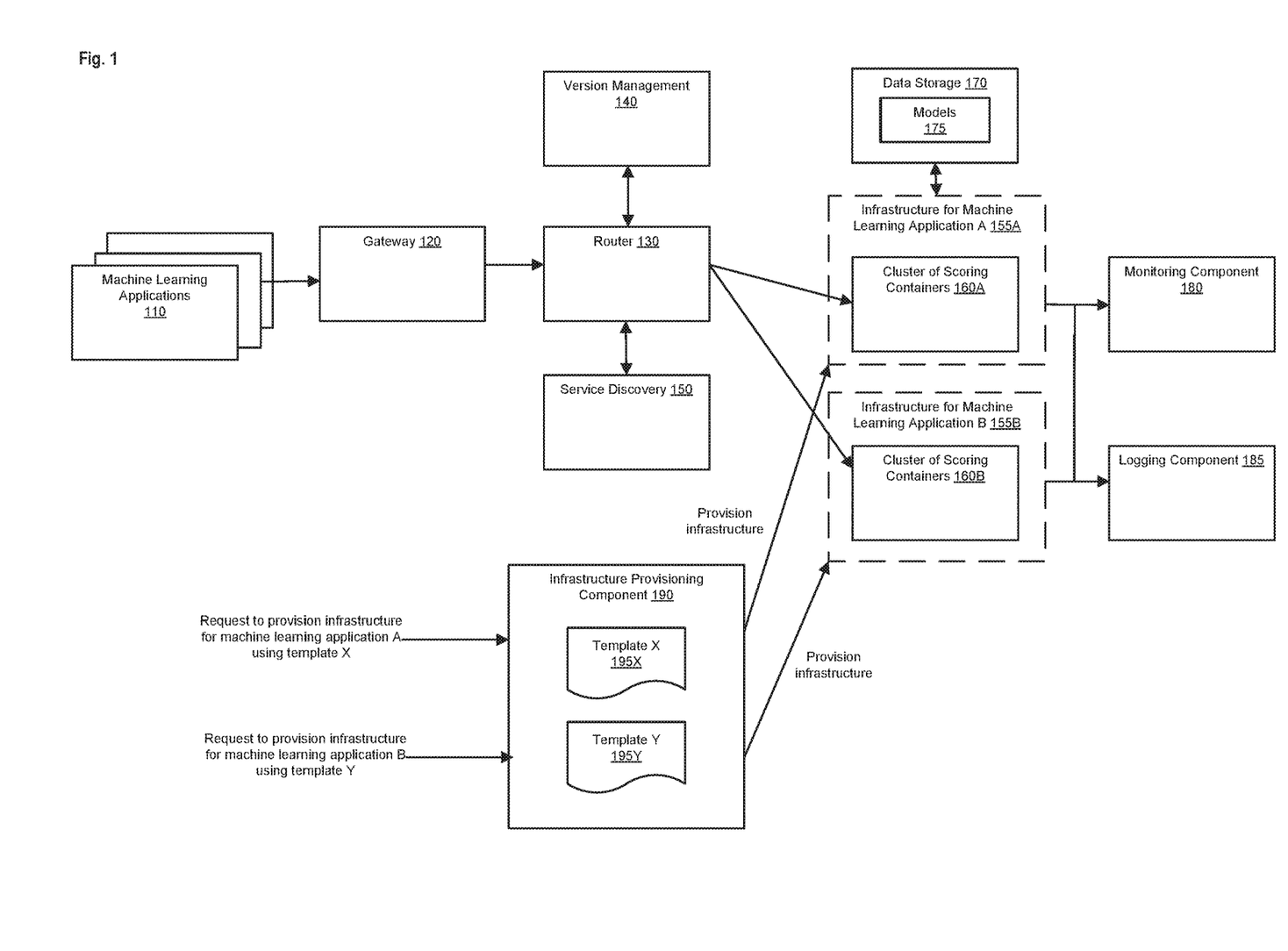
FIG. 1 is a block diagram illustrating a multi-tenant on-demand serving infrastructure, according to some example implementations.

FIG. 1 is a block diagram illustrating a multi-tenant on-demand serving infrastructure, according to some example implementations. The multi-tenant on-demand serving infrastructure (also referred to herein simply as a serving infrastructure) may provide a scoring service that serves models for multiple tenants on demand A model may be a representation of what a machine learning algorithm has learned after analyzing training data. The scoring service may support a large number of tenants and models (e.g., more than 10,000 models), support high volume/throughput (e.g., more than 600 scoring requests per second), and be designed to scale out to support larger numbers of tenants and/or models and higher scoring request loads. The scoring service may support multiple types of scoring libraries and multiple versions of the same scoring library. A scoring library may be a collection of software resources used for providing scoring functionality. Examples of scoring libraries include, but are not limited to, AutoML®, Transmogrifai®, TensorFlow®, XGBoost®, and FAiss®. The scoring service may receive scoring requests from machine learning applications, apply models to new data to generate scoring results (e.g., predictions/inferences based on the new data), and provide the scoring results as scoring responses to the requesting machine learning applications.

As shown in the diagram, the serving infrastructure includes machine learning applications 110, a gateway component 120, a router component 130, a version management component 140, a service discovery component 150, a data storage component 170, clusters of scoring containers 160A-C, and an infrastructure provisioning component 190. Each of the components may be implemented using one or more electronic devices.

As used herein, a scoring container is a containerized application that provides scoring functionality. A scoring container may include a scoring library that can be used to apply models to data to generate scoring results (e.g., predictions/inferences). The serving infrastructure may include scoring containers supporting different types and/or versions of scoring libraries. In an implementation, the scoring containers are organized into clusters, where each cluster includes a group of scoring containers having the same scoring library (e.g., same type and same version of the scoring library). Each cluster of scoring containers may provide scoring functionality for one or more machine learning applications or use cases. For example, in the example shown in the diagram, clusters 160A and 160B may provide scoring functionality for machine learning application A, while cluster 160C provides scoring functionality for machine learning application B. Organizing scoring containers into clusters may help with ensuring high availability and low latency (e.g., scoring requests that are sent to a cluster 160 can be load balanced among the scoring containers in that cluster 160).

A scoring container may access the data storage component 170 to obtain models 175 stored therein. The scoring container may implement a caching mechanism to cache models it obtains from the data storage (e.g., in local memory) to avoid having to access the data storage component 170 every time it needs a model (e.g., which helps reduce latency). The scoring container may use any suitable cache replacement/eviction policy (e.g., least recently used) to replace/evict models in its cache.

The gateway component 120 serves as the entry point for the scoring service. The gateway component 120 may implement an API that allows the machine learning applications 110 to submit scoring requests to the scoring service. In an implementation, the gateway component 120 provides protection against bursty loads, performs Internet Protocol (IP) filtering (e.g., to only allow incoming scoring requests from known hosts), and/or performs various security-related functionality (e.g., to only allow API calls over Hypertext Transfer Protocol Secure (HTTPS)). The gateway component 120 may receive scoring requests from the machine learning applications 110 and send the scoring requests to the router component 130 to be routed to the appropriate scoring container or cluster of scoring containers 160.

The router component 130 routes incoming scoring requests to the appropriate scoring container or cluster of scoring containers 160. When the router component 130 receives a scoring request from the gateway component 120 it may consult the version management component 140 and/or the service discovery component 150 to determine which scoring container or cluster of scoring containers 160 is to provide scoring functionality for the scoring request.

The version management component 140 may keep track of information regarding which versions of scoring libraries and/or which versions of models are to be used for different tenants and/or machine learning applications 110. The router component 130 may consult the version management component 140 to determine which particular version of a scoring library and/or which particular version of a model to use to process a scoring request (e.g., depending on the tenant and/or the machine learning application 110 associated with the scoring request).

The service discovery component 150 may maintain a mapping of which scoring containers or clusters of scoring containers 160 support which tenants, scoring libraries, and/or models. The service discovery component may be implemented using a service discovery tool such as Consul® or Zookeeper®. The router component 130 may consult the service discovery component 150 to determine which scoring container or cluster of scoring containers 160 is to provide scoring functionality for the scoring request. The router component 130 may then send the scoring request to that scoring container or cluster of scoring containers 160.

A scoring container that receives a scoring request from the router component 130 may provide scoring functionality for that scoring request using its scoring library. This may involve obtaining the appropriate model (e.g., from the data storage component 170 or from its cache) and applying the model to the data indicated by the scoring request using the scoring library to generate a scoring result. The scoring container may then send the scoring result back to the router component 130, which in turn sends the scoring result back to the requesting machine learning application 110 (via the gateway component 120) as a response to the scoring request. In an implementation, the router component 130 subdivides an incoming scoring request into multiple scoring requests that are to be sent to multiple different scoring containers or clusters of scoring containers 160. In such an implementation, the router component 130 may aggregate the scoring results generated by the multiple different scoring containers or clusters of scoring containers 160 and send the aggregated scoring result back to the requesting machine learning application 110 (via the gateway component 120) as a response to the original scoring request.

As mentioned above, in existing serving infrastructures, onboarding a new machine learning application 110 (e.g., to provide scoring functionality for the machine learning application 110) requires manually designing and provisioning various infrastructure for the machine learning application 110 such as a web server, a continuous integration pipeline, and a continuous deployment pipeline. This setup process can be complex and take a long time to complete (e.g., in the order of months).

To address this problem, in an implementation, the serving infrastructure includes an infrastructure provisioning component 190 that can provision infrastructures for machine learning applications 110 using predefined templates 195. In an implementation, the infrastructure provisioning component 190 is a system that provides infrastructure-as-code (IaC) capabilities. IaC is the process of managing and provisioning computer systems through machine-readable definition files, rather than physical hardware configuration or interactive configuration tools.

As shown in the diagram, the infrastructure provisioning component 190 stores or otherwise has access to templates 195. For example, the infrastructure provisioning component 190 may store template X 195X and template Y 195Y. Each template 195 may include various information that can be used to provision an infrastructure for a machine learning application 110. In an implementation, each template 195 indicates a scoring interface (e.g., a Java® interface or a Python® interface), a web server, a definition of a continuous integration pipeline, and a definition of a continuous deployment pipeline. For the sake of illustration, only two templates 195 are shown in the diagram. It should be understood that implementations may have more than two templates 195.

The infrastructure for a machine learning application 110 may be provisioned by submitting a request to the infrastructure provisioning component 190 to provision the infrastructure using a specified template 195. In an implementation, the request is submitted to the infrastructure provisioning component 190 using a command line interface (CLI) of the infrastructure provisioning component 190. In response to receiving the request, the infrastructure provisioning component 190 may provision the infrastructure for the machine learning application 110 according to information included in the specified template 195. In an implementation, provisioning the infrastructure for the machine learning application 110 involves creating a version control system repository for the machine learning application 110 that includes a project that has dependencies on a library of the scoring interface indicated in specified template 195 and a library of the web server indicated in the specified template 195, creating a continuous integration pipeline for the machine learning application 110 based on the definition of the continuous integration pipeline indicated in the specified template 195, and creating a continuous deployment pipeline for the machine learning application 110 based on the definition of the continuous deployment pipeline indicated in the specified template 195. In an implementation, the version control system repository is a Git® repository.

For example, as shown in the diagram, a request may be submitted to the infrastructure provisioning component 190 to provision an infrastructure for machine learning application A using template X 195X. In response to receiving the request, the infrastructure provisioning component 190 may provision the infrastructure for machine learning application A (infrastructure 155A) by creating a version control system repository for machine learning application A that includes a project that has dependencies on a library of the scoring interface indicated in template X 195X and a library of the web server indicated in template X 195X, creating a continuous integration pipeline for machine learning application A based on the definition of the continuous integration pipeline indicated in template X 195X, and creating a continuous deployment pipeline for machine learning application A based on the definition of the continuous deployment pipeline indicated in template X 195X.

Similarly, a request may be submitted to the infrastructure provisioning component 190 to provision an infrastructure for machine learning application B using template Y 195Y. In response to receiving the request, the infrastructure provisioning component 190 may provision the infrastructure for machine learning application B (infrastructure 155B) by creating a version control system repository for machine learning application B that includes a project that has dependencies on a library of the scoring interface indicated in template Y 195Y and a library of the web server indicated in template Y 195Y, creating a continuous integration pipeline for machine learning application B based on the definition of the continuous integration pipeline indicated in template Y 195Y, and creating a continuous deployment pipeline for machine learning application B based on the definition of the continuous deployment pipeline indicated in template Y 195Y.

Changes to the project stored in the version control system repository of a machine learning application 110 may trigger the continuous integration pipeline of the machine learning application 110. The continuous integration pipeline of the machine learning application may build a scoring container image based on the project included in the version control system repository of the machine learning application 110. The successful build of the scoring container image may trigger the continuous deployment pipeline of the machine learning application 110. The continuous deployment pipeline of the machine learning application 110 may deploy a cluster of scoring containers 160 based on the scoring container image. The cluster of scoring containers 160 may implement the web server and the scoring interface to provide scoring functionality for the machine learning application 110. In an implementation, the web server integrates with a monitoring component 180 (e.g., to send various information/statistics regarding the operation of the cluster of scoring containers 160 to the monitoring component 180). The monitoring component 180 may provide a dashboard for displaying metrics of the cluster of scoring containers 160 (e.g., for display to an administrator). In an implementation, the web server integrates with a logging component 185 (e.g., to send a log of events generated by the cluster of scoring containers 160). The logging component 185 may record and manage the log of events generated by the cluster of scoring containers 160. In an implementation, the logging component 185 is Splunk® or a similar log/data monitoring/analyzing tool. In an implementation, the web server also provides model caching and authentication/authorization functionality.

Thus, implementations may use predefined templates 195 to automatically provision infrastructures for machine learning applications 110 in a serving infrastructure, which eliminates/reduces the amount of manual effort required to provision infrastructures and allows for infrastructures to be provisioned more quickly (e.g., in a matter of hours/days instead of a matter of months). The infrastructure for a machine learning application 110 may address the platform-level concerns for providing scoring functionality for the machine learning application 110 (e.g., provide the basic components that are needed for providing scoring functionality that are expected to be common across several machine learning applications). The machine learning application developer (or similar entity) may add custom application implementation to the infrastructure customize the scoring functionality for the machine learning application 110.

Figure 2:
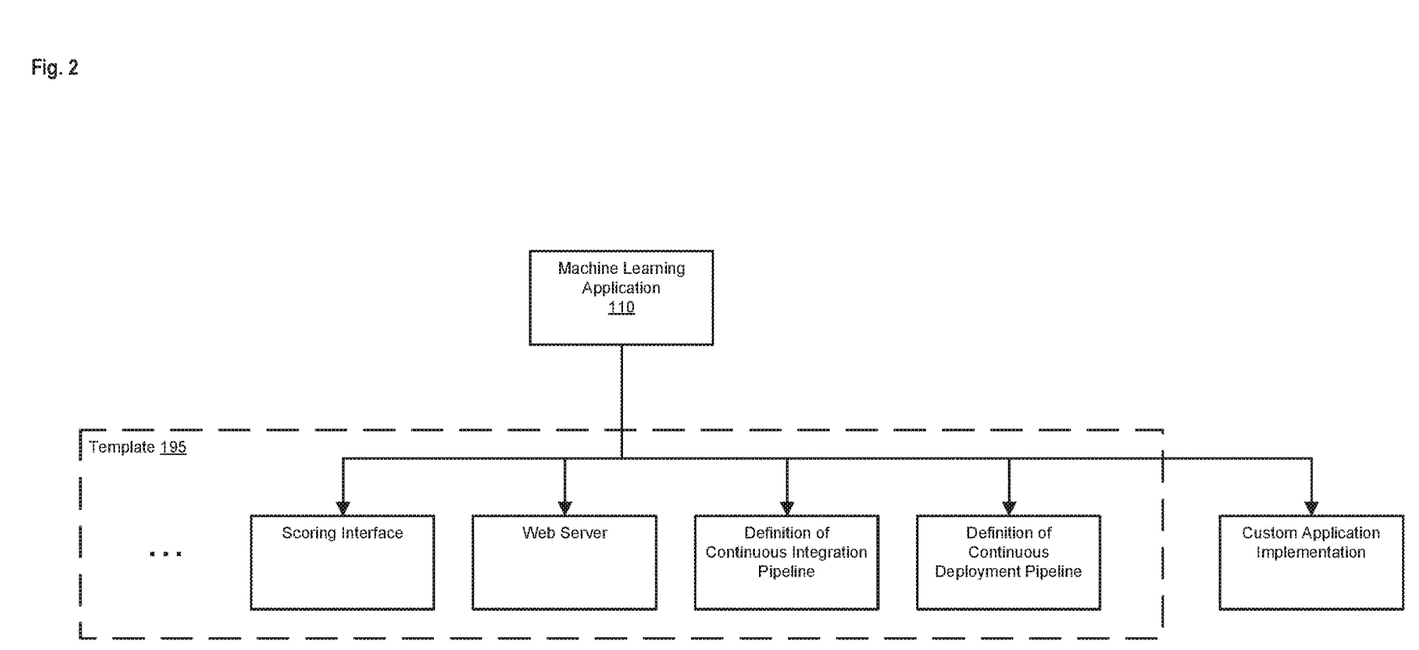
FIG. 2 is a diagram illustrating a template, according to some example implementations.

FIG. 2 is a diagram illustrating a template, according to some example implementations. As shown in the diagram a template 195 may indicate, among other things, a scoring interface, a web server, a definition of a continuous integration pipeline, and a definition of a continuous deployment pipeline.

The scoring interface may be a programmatic interface (e.g., a Java® interface, a Python® interface, or similar interface defined using a different programming language) that defines the methods that a scoring container or cluster of scoring containers should implement to provide scoring functionality for a machine learning application 110. For example, the scoring interface may define a "load" method for loading a model and a "score" method for scoring data (e.g., applying a model to data to generate a scoring result/prediction). The template 195 may indicate the scoring interface by including a reference to a library/code that defines the scoring interface.

The web server may be a server that a scoring container or cluster of scoring containers implements to receive web requests and generate/send corresponding web responses as part of providing scoring functionality for a machine learning application 110. In an implementation, the web server integrates with a monitoring component 180 that provides a dashboard for displaying metrics of a cluster of scoring containers. In an implementation, the web server integrates with a logging component 185 that maintains a log of events generated by a cluster of scoring containers. In an implementation, the web server includes model caching and authentication/authorization functionality. The template 195 may indicate the web server by including a reference to a library/code of the web server.

The definition of the continuous integration pipeline may define a series of operations for performing continuous integration of code. The continuous integration pipeline may build a scoring container image based on code included in a version control system repository. The template 195 may indicate the definition of the continuous integration pipeline by including a reference to a Strata® file or similar file of another continuous integration tool that defines the continuous integration pipeline.

The definition of the continuous deployment pipeline may define a series of operations for performing continuous deployment. The continuous deployment pipeline may deploy a cluster of scoring containers based on a scoring container image. The template 195 may indicate the definition of the continuous deployment pipeline by including a reference to a Spinnaker® file or similar file of another continuous deployment tool that defines the continuous deployment pipeline.

The custom application implementation may include implementation details that are specific to providing scoring functionality for a particular machine learning application 110. The template 195, together with the custom application implementation, may be used to provision a customized infrastructure for the machine learning application 110.

Figure 3:
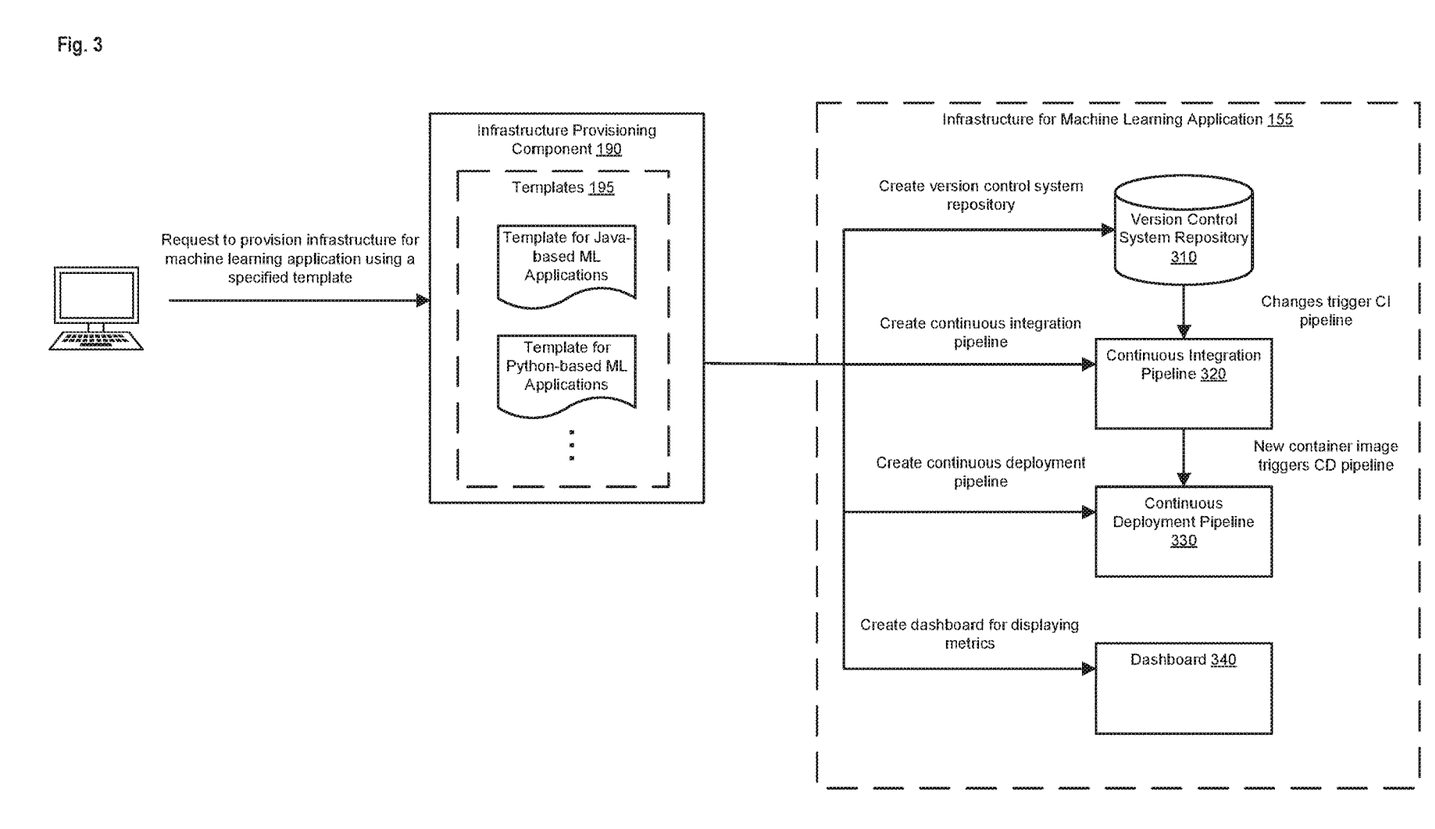
FIG. 3 is a diagram illustrating an infrastructure for a machine learning application that is provisioned using a template, according to some example implementations.

FIG. 3 is a diagram illustrating an infrastructure for a machine learning application that is provisioned using a template, according to some example implementations.

As shown in the diagram, a request may be sent to the infrastructure provisioning component 190 to provision an infrastructure for a particular machine learning application 110 using a specified template 195. In this example, the infrastructure provisioning component 190 includes a template for Java-based machine learning applications and a template for Python-based machine learning applications. In response to receiving the request, the infrastructure provisioning component 190 may access the specified template 195 and provision the infrastructure for the machine learning application using the specified template 195.

In the example shown in the diagram, provisioning the infrastructure involves creating a version control system repository 310 for the machine learning application 110, creating a continuous integration pipeline 320 for the machine learning application 110, creating a continuous deployment pipeline 330 for the machine learning application 110, and creating a dashboard 340 for the machine learning application 110.

The version control system repository 310 for the machine learning application may include a project that has dependencies on a library of the scoring interface indicated in the specified template and a library of the web server indicated in the specified template. Any changes to the project in the version control system repository 310 may trigger the continuous integration pipeline 320.

The continuous integration pipeline 320 may build a scoring container image based on the current version of the project (and its dependencies) stored in the version control system repository 310. The building of the new scoring container image may trigger the continuous deployment pipeline 330.

The continuous deployment pipeline 330 may deploy a cluster of scoring containers that provide scoring functionality for the machine learning application based on the container image.

The dashboard 340 may display metrics of the cluster of scoring containers for monitoring/debugging purposes.

Figure 4:
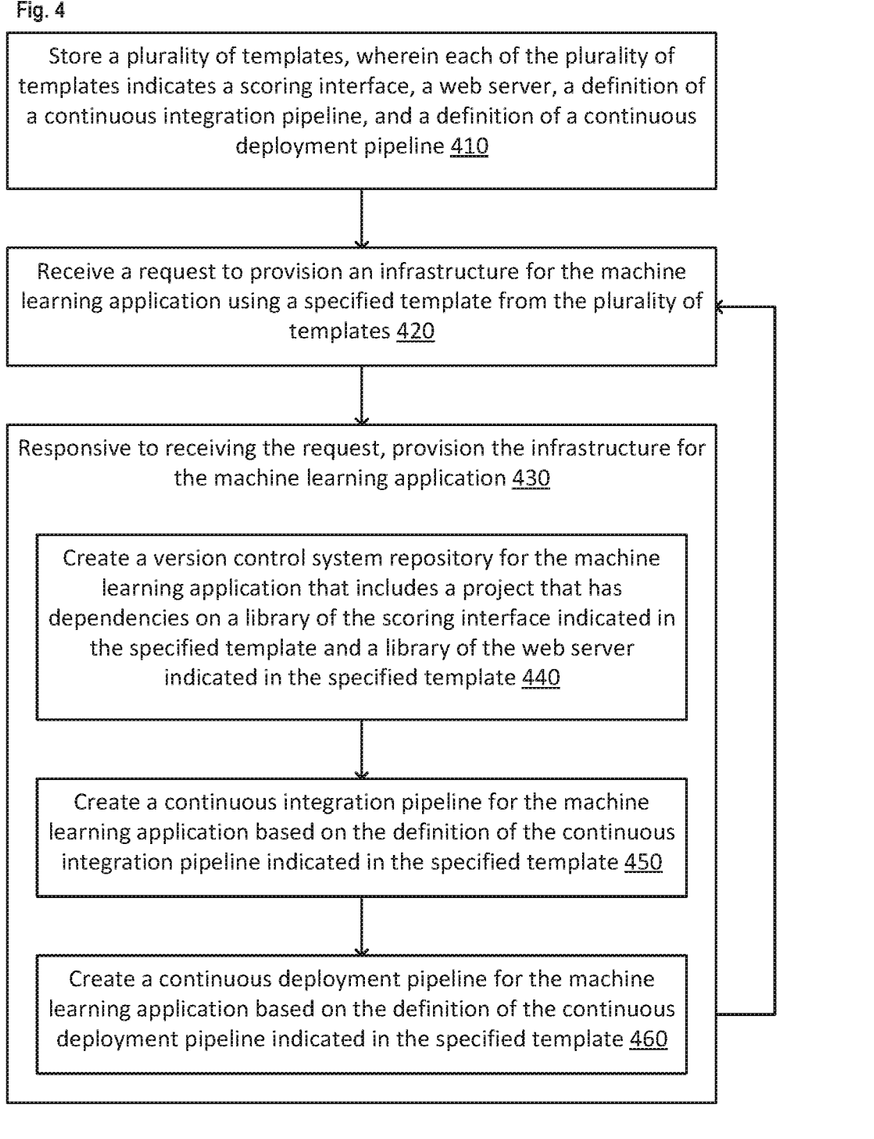
FIG. 4 is a flow diagram illustrating a process for provisioning an infrastructure for a machine learning application in a multi-tenant on-demand serving infrastructure using a template, according to some example implementations.

FIG. 4 is a flow diagram illustrating a process for provisioning an infrastructure for a machine learning application in a multi-tenant on-demand serving infrastructure using a template, according to some example implementations. In an implementation, the process is implemented by one or more electronic devices (e.g., one or more electronic devices implementing an infrastructure provisioning component 190).

At block 410, the one or more electronic devices store a plurality of templates, wherein each of the plurality of templates indicates a scoring interface, a web server, a definition of a continuous integration pipeline, and a definition of a continuous deployment pipeline.

At block 420, the one or more electronic devices receive a request to provision an infrastructure for the machine learning application using a specified template from the plurality of templates. In an implementation, the one or more electronic devices implement an infrastructure provisioning component and the request is received via a command line interface of the infrastructure provisioning component.

At block 430, responsive to receiving the request, the one or more electronic devices provision the infrastructure for the machine learning application. Provisioning the infrastructure for the machine learning application may involve creating a version control system repository for the machine learning application that includes a project that has dependencies on a library of the scoring interface indicated in the specified template and a library of the web server indicated in the specified template (block 440), creating a continuous integration pipeline for the machine learning application based on the definition of the continuous integration pipeline indicated in the specified template (block 450), and creating a continuous deployment pipeline for the machine learning application based on the definition of the continuous deployment pipeline indicated in the specified template (block 460).

In an implementation, the scoring interface indicated in the specified template is a Java interface or a Python interface. In an implementation, the continuous integration pipeline of the machine learning application is configured to build a scoring container image based on the project included in the version control system repository of the machine learning application. In an implementation, the continuous deployment pipeline of the machine learning application is configured to deploy a cluster of scoring containers based on the scoring container image. In an implementation, the cluster of scoring containers provides scoring functionality for the machine learning application. In an implementation, the cluster of scoring containers integrates with a monitoring component that provides a dashboard for displaying metrics of the cluster of scoring containers (e.g., the web servers implemented by the scoring containers may include functionality to integrate with the monitoring component). In an implementation, the cluster of scoring containers integrates with a logging component that maintains a log of events generated by the cluster of scoring containers (e.g., the web servers implemented by the scoring containers may include functionality to integrate with the logging component).

In an implementation, the operations of blocks 420-460 may be repeated for one or more other requests to provision infrastructures for other machine learning applications.

Example Electronic Devices and Environments

Electronic Device and Machine-Readable Media

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 5A:
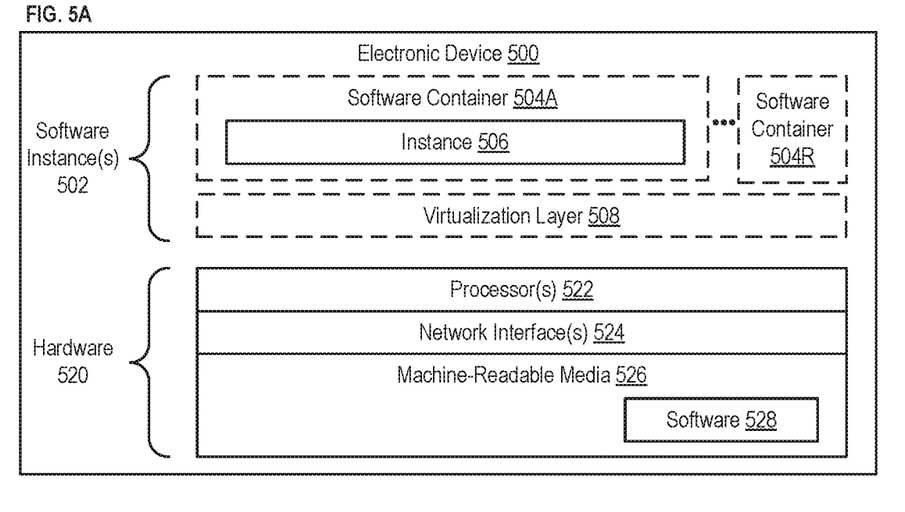
FIG. 5A is a block diagram illustrating an electronic device, according to some example implementations.

FIG. 5A is a block diagram illustrating an electronic device 500 according to some example implementations. FIG. 5A includes hardware 520 comprising a set of one or more processor(s) 522, a set of one or more network interfaces 524 (wireless and/or wired), and machine-readable media 526 having stored therein software 528 (which includes instructions executable by the set of one or more processor(s) 522). The machine-readable media 526 may include non-transitory and/or transitory machine-readable storage medium/media. Each of the previously described clients and the scoring service (e.g., including the functionality of the infrastructure provisioning component 190) may be implemented in one or more electronic devices 500. In one implementation: 1) each of the clients is implemented in a separate one of the electronic devices 500 (e.g., in end user devices where the software 528 represents the software to implement clients to interface directly and/or indirectly with the scoring service (e.g., software 528 represents a web browser, a native client, a portal, a command-line interface, and/or an application programming interface (API) based upon protocols such as Simple Object Access Protocol (SOAP), Representational State Transfer (REST), etc.)); 2) the scoring service is implemented in a separate set of one or more of the electronic devices 500 (e.g., a set of one or more server devices where the software 528 represents the software to implement the scoring service); and 3) in operation, the electronic devices implementing the clients and the scoring service would be communicatively coupled (e.g., by a network) and would establish between them (or through one or more other layers and/or or other services) connec-tions for submitting requests to provision infrastructures for machine learning applications to the scoring service and returning responses (e.g., including an indication of success and/or various information about the newly provisioned infrastructure) to the clients. Other configurations of electronic devices may be used in other implementations (e.g., an implementation in which the client and the scoring service are implemented on a single one of electronic device 500).

During operation, an instance of the software 528 (illustrated as instance 506 and referred to as a software instance; and in the more specific case of an application, as an application instance) is executed. In electronic devices that use compute virtualization, the set of one or more processor(s) 522 typically execute software to instantiate a virtualization layer 508 and one or more software container(s) 504A-504R (e.g., with operating system-level virtualization, the virtualization layer 508 may represent a container engine (such as Docker Engine by Docker, Inc. or rkt in Container Linux by Red Hat, Inc.) running on top of (or integrated into) an operating system, and it allows for the creation of multiple software containers 504A-504R (representing separate user space instances and also called virtualization engines, virtual private servers, or jails) that may each be used to execute a set of one or more applications; with full virtualization, the virtualization layer 508 represents a hypervisor (sometimes referred to as a virtual machine monitor (VMM)) or a hypervisor executing on top of a host operating system, and the software containers 504A-504R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 528 is executed within the software container 504A on the virtualization layer 508. In electronic devices where compute virtualization is not used, the instance 506 on top of a host operating system is executed on the "bare metal" electronic device 500. The instantiation of the instance 506, as well as the virtualization layer 508 and software containers 504A-504R if implemented, are collectively referred to as software instance(s) 502.

Alternative implementations of an electronic device may have numerous variations from that described above. For example, customized hardware and/or accelerators might also be used in an electronic device.

Example Environment

Figure 5B:
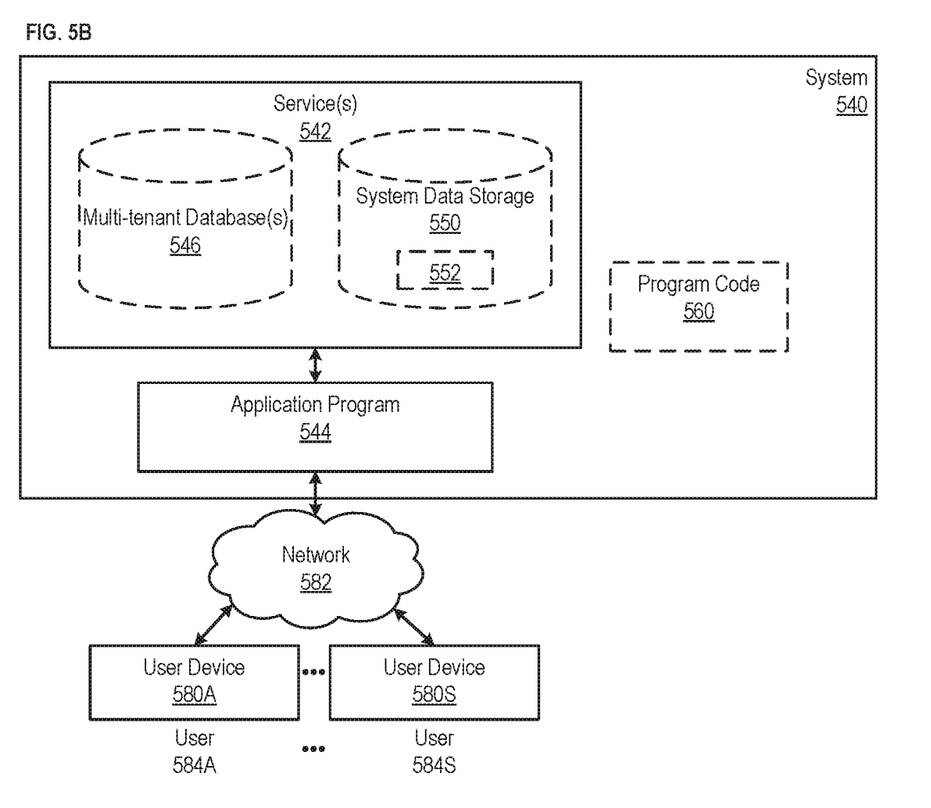
FIG. 5B is a block diagram of a deployment environment, according to some example implementations.

FIG. 5B is a block diagram of a deployment environment according to some example implementations. A system 540 includes hardware (e.g., a set of one or more server devices) and software to provide service(s) 542, including the scoring service (e.g., including functionality of the infrastructure provisioning component 190). In some implementations the system 540 is in one or more datacenter(s). These datacenter(s) may be: 1) first party datacenter(s), which are datacenter(s) owned and/or operated by the same entity that provides and/or operates some or all of the software that provides the service(s) 542; and/or 2) third-party datacenter(s), which are datacenter(s) owned and/or operated by one or more different entities than the entity that provides the service(s) 542 (e.g., the different entities may host some or all of the software provided and/or operated by the entity that provides the service(s) 542). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 540 is coupled to user devices 580A-580S over a network 582. The service(s) 542 may be on-demand services that are made available to one or more of the users 584A-584S working for one or more entities other than the entity which owns and/or operates the on-demand services (those users sometimes referred to as outside users) so that those entities need not be concerned with building and/or maintaining a system, but instead may make use of the service(s) 542 when needed (e.g., when needed by the users 584A-584S). The service(s) 542 may communicate with each other and/or with one or more of the user devices 580A-580S via one or more APIs (e.g., a REST API). In some implementations, the user devices 580A-580S are operated by users 584A-584S, and each may be operated as a client device and/or a server device. In some implementations, one or more of the user devices 580A-580S are separate ones of the electronic device 500 or include one or more features of the electronic device 500.

In some implementations, the system 540 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 540 is a multi-tenant cloud computing architecture supporting multiple services, such as one or more of the following types of services: scoring service 542 (also referred to as a machine learning inferencing service, a prediction service, an on-demand service, a machine learning service, and model serving service), Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 540 may include an application platform 544 that enables PAAS for creating, managing, and executing one or more applications developed by the provider of the application platform 544, users accessing the system 540 via one or more of user devices 580A-580S, or third-party application developers accessing the system 540 via one or more of user devices 580A-580S.

In some implementations, one or more of the service(s) 542 may use one or more multi-tenant databases 546, as well as system data storage 550 for system data 552 accessible to system 540. In certain implementations, the system 540 includes a set of one or more servers that are running on server electronic devices and that are configured to handle requests for any authorized user associated with any tenant (there is no server affinity for a user and/or tenant to a specific server). The user devices 580A-580S communicate with the server(s) of system 540 to request and update tenant-level data and system-level data hosted by system 540, and in response the system 540 (e.g., one or more servers in system 540) automatically may generate one or more Structured Query Language (SQL) statements (e.g., one or more SQL queries) that are designed to access the desired information from the multi-tenant database(s) 546 and/or system data storage 550.

In some implementations, the service(s) 542 are implemented using virtual applications dynamically created at run time responsive to queries from the user devices 580A-580S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 560 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 544 includes an application setup mechanism that supports application developers' creation and management of applications, which may be saved as metadata by save routines. Invocations to such applications, including the scoring service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 582 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 540 and the user devices 580A-580S.

Each user device 580A-580S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 540. For example, the user interface device can be used to access data and applications hosted by system 540, and to perform searches on stored data, and otherwise allow one or more of users 584A-584S to interact with various GUI pages that may be presented to the one or more of users 584A-584S. User devices 580A-580S might communicate with system 540 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 580A-580S might include an HTTP client, commonly referred to as a "browser," for sending and receiving HTTP messages to and from server(s) of system 540, thus allowing users 584A-584S of the user devices 580A-580S to access, process and view information, pages and applications available to it from system 540 over network 582.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A method by one or more electronic devices to provision an infrastructure for a machine learning application in a multi-tenant on-demand serving infrastructure, the method comprising:

storing a plurality of templates, wherein each of the plurality of templates indicates a scoring interface, a web server, a definition of a continuous integration pipeline, and a definition of a continuous deployment pipeline;

receiving a request to provision the infrastructure for the machine learning application using a specified template from the plurality of templates; and responsive to receiving the request, provisioning the infrastructure for the machine learning application by (1) creating a version control system repository for the machine learning application that includes a project that has dependencies on a library of the scoring interface indicated in the specified template and a library of the web server indicated in the specified template, (2) creating a continuous integration pipeline for the machine learning application based on the definition of the continuous integration pipeline indicated in the specified template, and (3) creating a continuous deployment pipeline for the machine learning application based on the definition of the continuous deployment pipeline indicated in the specified template.

2. The method of claim 1, wherein the one or more electronic devices implement an infrastructure provisioning component and the request is received via a command line interface of the infrastructure provisioning component.

3. The method of claim 1, wherein the scoring interface indicated in the specified template is a Java interface or a Python interface.

4. The method of claim 1, wherein the continuous integration pipeline of the machine learning application is configured to build a scoring container image based on the project included in the version control system repository of the machine learning application.

5. The method of claim 4, wherein the continuous deployment pipeline of the machine learning application is configured to deploy a cluster of scoring containers based on the scoring container image.

6. The method of claim 5, wherein the cluster of scoring containers provides scoring functionality for the machine learning application.

7. The method of claim 5, wherein the cluster of scoring containers integrates with a monitoring component that provides a dashboard for displaying metrics of the cluster of scoring containers.

8. The method of claim 5, wherein the cluster of scoring containers integrates with a logging component that maintains a log of events generated by the cluster of scoring containers.

9. The method of claim 1, further comprising:
receiving a second request to provision an infrastructure for a second machine learning application using a second specified template from the plurality of templates; and
responsive to receiving the second request, provisioning the infrastructure for the second machine learning application by (1) creating a version control system repository for the second machine learning application that includes a project that has dependencies on a library of the scoring interface indicated in the second specified template and a library of the web server indicated in the second specified template, (2) creating a continuous integration pipeline for the second machine learning application based on the definition of the continuous integration pipeline indicated in the second specified template, and (3) creating a continuous deployment pipeline for the second machine learning application based on the definition of the continuous deployment pipeline indicated in the second specified template.

10. A non-transitory machine-readable storage medium that provides instructions that, if executed by one or more processors of one or more electronic devices, are configurable to cause said one or more electronic devices to perform operations for provisioning an infrastructure for a machine learning application in a multi-tenant on-demand serving infrastructure, the operations comprising:
storing a plurality of templates, wherein each of the plurality of templates indicates a scoring interface, a web server, a definition of a continuous integration pipeline, and a definition of a continuous deployment pipeline;
receiving a request to provision the infrastructure for the machine learning application using a specified template from the plurality of templates; and
responsive to receiving the request, provisioning the infrastructure for the machine learning application by (1) creating a version control system repository for the machine learning application that includes a project that has dependencies on a library of the scoring interface indicated in the specified template and a library of the web server indicated in the specified template, (2) creating a continuous integration pipeline for the machine learning application based on the definition of the continuous integration pipeline indicated in the specified template, and (3) creating a continuous deployment pipeline for the machine learning application based on the definition of the continuous deployment pipeline indicated in the specified template.

11. The non-transitory machine-readable storage medium of claim 10, wherein the one or more electronic devices implement an infrastructure provisioning component and the request is received via a command line interface of the infrastructure provisioning component.

12. The non-transitory machine-readable storage medium of claim 10, wherein the scoring interface indicated in the specified template is a Java interface or a Python interface.

13. The non-transitory machine-readable storage medium of claim 10, wherein the continuous integration pipeline of the machine learning application is configured to build a scoring container image based on the project included in the version control system repository of the machine learning application.

14. The non-transitory machine-readable storage medium of claim 13, wherein the continuous deployment pipeline of the machine learning application is configured to deploy a cluster of scoring containers based on the scoring container image.

15. The non-transitory machine-readable storage medium of claim 14, wherein the cluster of scoring containers provides scoring functionality for the machine learning application.

16. An apparatus comprising:
one or more processors; and
a non-transitory machine-readable storage medium that provides instructions that, if executed by the one or more processors, are configurable to cause the apparatus to perform operations for provisioning an infrastructure for a machine learning application in a multi-tenant on-demand serving infrastructure, the operations comprising:
storing a plurality of templates, wherein each of the plurality of templates indicates a scoring interface, a web server, a definition of a continuous integration pipeline, and a definition of a continuous deployment pipeline;
receiving a request to provision the infrastructure for the machine learning application using a specified template from the plurality of templates; and
responsive to receiving the request, provisioning the infrastructure for the machine learning application by (1) creating a version control system repository for the machine learning application that includes a project that has dependencies on a library of the scoring interface indicated in the specified template and a library of the web server indicated in the specified template, (2) creating a continuous integration pipeline for the machine learning application based on the definition of the continuous integration pipeline indicated in the specified template, and (3) creating a continuous deployment pipeline for the machine learning application based on the definition of the continuous deployment pipeline indicated in the specified template.

17. The apparatus of claim 16, wherein the apparatus implements an infrastructure provisioning component and the request is received via a command line interface of the infrastructure provisioning component.

18. The apparatus of claim 16, wherein the scoring interface indicated in the specified template is a Java interface or a Python interface.

19. The apparatus of claim 16, wherein the continuous integration pipeline of the machine learning application is configured to build a scoring container image based on the project included in the version control system repository of the machine learning application.

20. The apparatus of claim 19, wherein the continuous deployment pipeline of the machine learning application is configured to deploy a cluster of scoring containers based on the scoring container image.

* * * * *